US011060945B2

(12) United States Patent
Dodrill

(10) Patent No.: US 11,060,945 B2
(45) Date of Patent: Jul. 13, 2021

(54) ULTRA-VIOLET FLUORESCING SEALANT

(71) Applicant: Rollprint Packaging Products, Inc., Addison, IL (US)

(72) Inventor: Doug Dodrill, Addison, IL (US)

(73) Assignee: PAXXUS, Inc., Addison, IL (US)

( * ) Notice: Subject to any disclaimer, the term of this patent is extended or adjusted under 35 U.S.C. 154(b) by 119 days.

(21) Appl. No.: 15/986,417

(22) Filed: May 22, 2018

(65) Prior Publication Data

US 2019/0360890 A1 Nov. 28, 2019

(51) Int. Cl.
*G01N 21/64* (2006.01)
*G01M 3/38* (2006.01)
*B65D 75/58* (2006.01)
*B65D 75/28* (2006.01)

(52) U.S. Cl.
CPC ............... *G01M 3/38* (2013.01); *B65D 75/28* (2013.01); *B65D 75/5855* (2013.01); *G01N 21/643* (2013.01)

(58) Field of Classification Search
CPC ..... G01M 3/38; B65D 75/28; B65D 75/5855; G01N 21/643
See application file for complete search history.

(56) References Cited

U.S. PATENT DOCUMENTS

| | | | | |
|---|---|---|---|---|
| 4,549,980 A * | 10/1985 | Morris | .................... | D06L 4/664 |
| | | | | 252/301.23 |
| 4,627,642 A * | 12/1986 | Peronneau | ............. | B41M 3/144 |
| | | | | 156/277 |
| 5,605,738 A * | 2/1997 | McGinness | ............ | B41M 3/144 |
| | | | | 250/365 |
| 7,184,569 B2 * | 2/2007 | Lawandy | ............... | B41M 3/003 |
| | | | | 283/91 |
| 8,360,323 B2 * | 1/2013 | Widzinski, Jr. | ........ | G09F 3/0294 |
| | | | | 235/487 |
| 8,632,101 B2 * | 1/2014 | Mallol | .................... | D21H 21/44 |
| | | | | 283/113 |
| 10,275,969 B2 * | 4/2019 | Hussain | ............... | G07D 7/0053 |
| 10,283,017 B2 * | 5/2019 | Rancien | ............... | G09F 3/0292 |
| 2007/0065609 A1 * | 3/2007 | Korson | ................ | B65D 55/026 |
| | | | | 428/34.1 |
| 2011/0019283 A1 * | 1/2011 | Steenblik | ............... | D21H 21/40 |
| | | | | 359/622 |
| 2014/0120292 A1 * | 5/2014 | Dodrill | .............. | B29D 99/0053 |
| | | | | 428/41.6 |
| 2019/0180649 A1 * | 6/2019 | Herranen | ............... | G09F 3/0292 |
| 2020/0165038 A1 * | 5/2020 | Weisbecker | ............. | G07D 7/12 |

* cited by examiner

*Primary Examiner* — Christine S. Kim
(74) *Attorney, Agent, or Firm* — Seyfarth Shaw LLP

(57) ABSTRACT

A sealing element that visually indicates when a sealing element has been opened or corrupted without destruction of the seal. Ultraviolet light passes through a scattering layer and is absorbed by a fluorescing layer, the fluorescing layer reemitting the light in the visual spectrum and thereby allowing a user to inspect the integrity of the sealing element without otherwise destroying the seal.

19 Claims, 1 Drawing Sheet

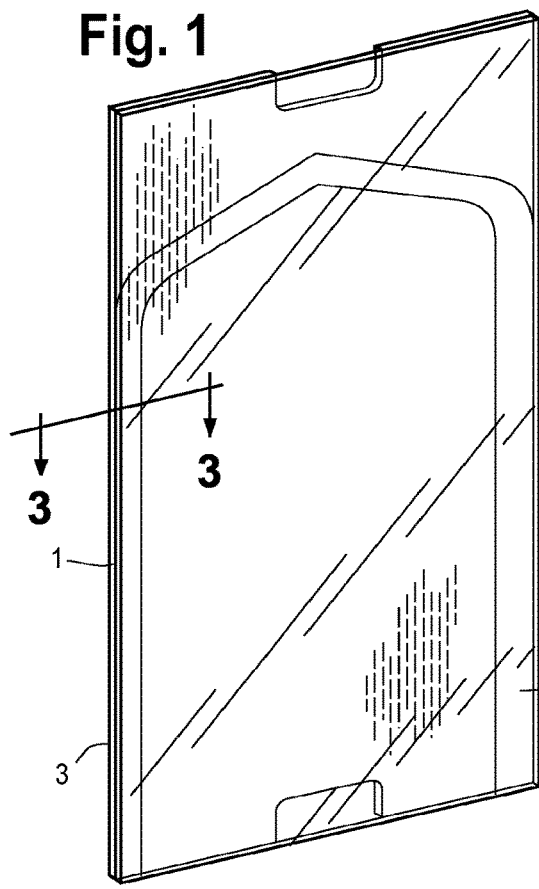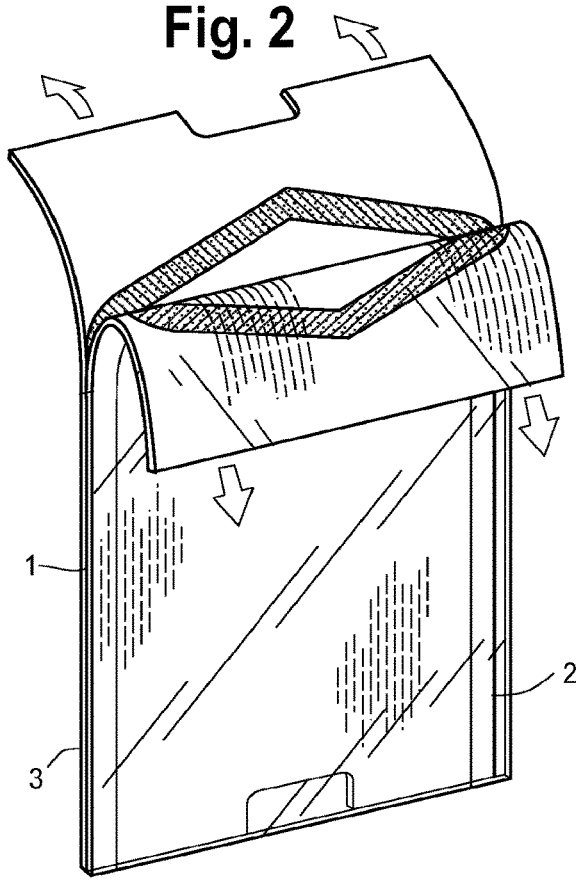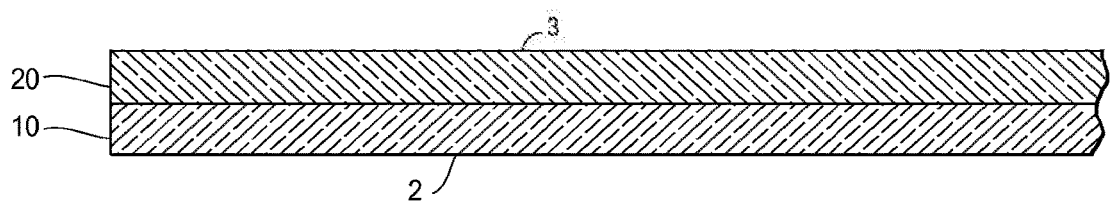

ULTRA-VIOLET FLUORESCING SEALANT

TECHNICAL FIELD OF THE INVENTION

The present application relates to sealant technology, and more particularly to sealing elements in which seal integrity may be inspected without destruction.

BACKGROUND OF THE INVENTION

Packaging is commonly created by creating a seal between two polymeric materials. For example, many flexible pouches include a heat seal around one or more edges of a film or laminate to create the package and protect the product within the package. The seal is effected by applying heat and pressure to multiple films or multi-layer laminates and causing mechanical bonding between two or more of the films.

The integrity of the seal is critical to the safety of many products. Incomplete or compromised seals can lead to the loss of sterility in a sterile medical package or spoilage for shelf-stable products. For example, the medical industry uses tamper-evident packaging to show when a sterile package has been opened or corrupted and thereby exposed to a non-sterile atmosphere, at times compromising the safe use of the contents of the package.

Current test methods for evaluating seal integrity are either destructive or prohibitively slow. For example, a common standard of testing whether a leak exists in the seal of a nonporous package is to apply a dye around the periphery of the seal which will visually indicate the presence of any corruption in the seal as the dye enters the packaging. Once such test is the ASTM International F3039 test, "Standard Test Method for Detecting Leaks in Nonporous Packaging or Flexible Barrier Materials by Dye Penetration." However, as the ASTM F3039 standard indicates, the test is destructive and any packaging tested using the dye penetration test cannot be used commercially.

Another destructive test for determining whether a peelable seal is corrupted requires the user to manually open the package and inspect the seal for "witness marks." When packaging has been properly sealed, the area of the seal will appear white or lighter after it has been peeled. However, if a fold, crease or imperfection (i.e. a hair or debris separating the two layers of the seal) arose when the packaging was sealed, the two layers of the packaging will not be in intimate contact at that point. Accordingly, when the packaging is later peeled apart, the fold, crease or other imperfection will not appear as white or as light as the areas of the seal that were properly sealed. However, such inspection is inherently destructive as the seal must be broken to perform the inspection.

In the event that the user (e.g., such as a doctor, nurse, or other medical professional) is not aware that the seal has been opened, the contents of the package may be used in an unsafe manner. Current packaging does not permit the user to economically inspect the integrity of the seal in a non-destructive manner.

SUMMARY OF THE INVENTION

The present application discloses a sealing element that visually indicates, both prior to and after peeling, whether the sealing element was properly created or corrupted. For example, the sealing element can include a light scattering layer and a fluorescing layer. The light scattering layer may be coupled to the fluorescing layer by heat sealing, ultrasonic sealing, or impulse sealing. The fluorescing layer contains an optical brightener which may fluoresce when exposed to ultraviolet light that has passed through the light scattering layer prior to being absorbed and then reemitted by the fluorescing layer. The portions of the fluorescing layer that will fluoresce when exposed to ultraviolet light are only those in intimate contact with the light scattering layer such that the ultraviolet light transmits through the light scattering layer. Therefore, the sealing element will visually indicate to the user, without destruction thereof, that the sealing element may be corrupt. Thus, sterility and security can be verified visually, either by the naked eye or an automated vision inspection system.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 1 is a prospective view of the sealing element in a pre-peeled state according to one embodiment of the present application.

FIG. 2 is a prospective view of the sealing element in a partially-peeled state according to one embodiment of the present application.

FIG. 3 is a view in section of layers of one embodiment of the present application.

It should be understood that any materials, dimensions and tolerances discussed herein are simple proposals such that one of ordinary skill in the art would be able to modify the proposals within the scope of the present application.

DETAILED DESCRIPTION OF THE EMBODIMENTS

While this invention is susceptible of embodiments in many different forms, there is shown in the drawings, and will herein be described in detail, embodiments of the invention with the understanding that the present disclosure is to be considered as an exemplification of the principles of the invention and is not intended to limit the broad aspect of the invention to embodiments illustrated.

The present application discloses a system and method for non-destructively indicating to a user whether a sealing element has been opened or corrupted during a sealing process subsequent thereto. The packaging incorporating the sealing element may be configured in any number of different configurations without departing from the spirit and scope of the invention. For example, the sealing element of the packaging may be peeled or torn open. In another embodiment, the packaging may incorporate a cohesive peeling sealing element, such as that disclosed in U.S. Ser. No. 14/064,433, and incorporated by reference in its entirety herein.

FIGS. 1 and 2 illustrate a package having the sealing element 1 on at least a portion of its peripheral edges, with FIG. 1 illustrating the pre-peeled or closed configuration and FIG. 2 illustrating a partially-peeled or open configuration. FIG. 3 discloses a cross-section of the sealing element 1. The sealing element 1 includes a first side 2 and a second side 3 opposite the first side 2. The layers of the sealing element include a first film 10 on the first side 2 and a second film 20 on the second side 3. The first film 10 and second film 20 make up the structural backbone of the sealing element 1 on the first side 2 and second side 3, respectively. As mentioned, in an embodiment the sealing element 1 may include additional layers, for example, the bulk and peel layers of the cohesive peeling sealing element in U.S. Ser. No. 14/064,433.

The first film 10 cooperates with the second film 20 to create the visual appearance of a fluorescence that is visible to a user when exposed to UV light. In use, UV light is emitted from a source and passes through the first film 10. Upon passage through the first film 10, the UV light is absorbed by the second film 20 containing an optical brightener which fluoresces to indicate that the sealing element has not been peeled apart or was otherwise corrupted during the sealing process or subsequent thereto. When manufactured, the seal between the first film 10 and the second film 20 is affected through heat sealing, ultrasonic sealing, or impulse sealing.

The first film 10 can be made of any of various materials known in the art, such as polymeric materials. For example, the first film 10 can be made of polyethylene, polyester, nylon, polypropylene, or any of various other polymer materials acting as a structural backbone of a package or sealing element 1. The sealing element can also be applied to any of various structures. For example, the first film 10 can be a cup, tray, flange, rim, board, base, shaft, or other structure.

The first film 10 acts as light scattering layer during inspection of the sealing element 1 when exposed to UV light. In an embodiment, the first film contains a white pigment with a low refractive index which permits at least some of the UV light to pass completely through the first film 10. It is well known in the industry to use titanium dioxide ($TiO_2$) in polymeric applications as it provides a white pigment with bright opacity. Additionally, titanium dioxide is chemically inert, insoluble in polymers and heat stable. However, any number of other pigments may be used without departing from the spirit and scope of the present invention. For example, the first film 10 may contain a non-opaque yellow pigment. According to additional aspects of the present disclosure, the first film 10 may include a non-woven material, such as, including but not limited to, Tyvek®.

The second film 20 is similar to the first film 10 by acting as a structural backbone for the sealing element 1. The second film 20 can also be made of any of various materials and may have multiple layers, polymeric or otherwise, for example, polyethylene, polyester, nylon, polypropylene, or any of various other polymers.

The second film 20 acts as a fluorescing layer, visually indicating to the user during inspection whether the seal between the first film 10 and second film 20 has been broken or otherwise corrupted. The second film 20 contains a chemical optical brightener which absorbs energy in the UV portion of the spectrum and re-emits it in the blue portion of the visible spectrum. As such, when the second film 20 is exposed to scattered UV light, it will fluoresce. In an embodiment, the optical brightener is in the stilbene class. More specifically, the optical brightener may be bis-stilbene, as bis-stilbene has been approved by the FDA for direct food contact and has a high heat tolerance. However, other optical brighteners can be used without departing from the spirit and scope of the present application. Additionally, the second film 20 may include a pigment or may be colorless, so long as the pigment permits the optical brightener to absorb the UV light passing through the first film 10 and fluoresce. For example, the second film 20 can be clear.

As discussed, the first film 10 and the second film 20 are sealed together through heat sealing, ultrasonic sealing, or impulse sealing. As shown in FIGS. 1 and 2, the sealing element 1 may be configured as a solid strip along at least a portion of the peripheral edges of the package. During inspection, the packaging is placed between the user (e.g., a detector) and a UV light source. The packaging is oriented such that the first side 2 and the first film 10 are nearer the UV light source, and the second side 3 and second film 20 are closer to the user. When the UV light source is turned on, at least some of the UV light passes through the light-scattering first film 10 and is absorbed by the optical brightener contained in the second film 20 where the first film 10 and the second film 20 are in intimate contact (e.g., where they are sealed). The optical brightener will cause the second film 20 to fluoresce at those points of intimate contact between the first and second films as the UV light is scattered by the first film 10 and absorbed by the second film 20.

In comparison, where the first film 10 and second film 20 are not in intimate contact within the sealing element 1 (e.g., where the packaging was not sealed off where the sealing element 1 has been broken or corrupted) the scattering effect of the first film 10 on the UV light is lost. If, for example, a piece of hair or other debris is present between the first film 10 and the second film 20 within the sealed portion of the packaging, the UV light passing through the first film 10 will be blocked from reaching the second film 20, preventing the optical brightener contained within the second film 20 from absorbing and re-emitting the light. Accordingly, the user viewing the packaging from the second side 2 will be able to visually identify the corruption within the seal where the sealing element 1 is not fluorescing. Similarly, if the packaging was previously opened, the intimate contact between the first film 10 and second film 20 will be lost, preventing the passage of scattered UV light from the first film 10 into the second film 20. The described UV inspection herein may work in both a non-peelable pouch (e.g., the user tears it open) and a peelable pouch.

According to aspects of the present disclosure, a computerized vision inspector (not shown) may be used to detect the integrity of the seal. For example, the computerized vision inspector may include existing technology used in the printing industry where a camera views a print on a packaging film, and the computer compares an actual image to a computer model to judge the print quality. In operation, the computerized vision inspector may be configured to compare the fluorescing image of the seal area to an ideal seal area shape. Any differences (e.g., voids in the seal) will be flagged.

The above disclosure provides a mechanism that allows a user to determine whether the sealing element 1 has been peeled apart or otherwise corrupted during the sealing process. Accordingly, the sealing element 1 can be used in a tamper-evident package and the contents of the sealing element 1 can remain sterile until opened. Prior opening or corruption of the fluorescing seal can be strongly and visually indicated to the user. The sealing element can include any of various colors, such as colors of a particular brand, hospital or any other color combination. Accordingly, branding can be applied to the sealing element 1 and utilized for marketing purposes.

The various films and sealants are discussed above as, in some cases, having a color attribute. While certain of the films or layers are described as having a color attribute it should be appreciated that others of the various layers may incorporate color attributes. Similarly, the films and sealants can be colored by any of various known means, including pigment, dye, or other coloring agent. The coloring agent can be concentrated, compounded, and/or combined into a polymer, and then blended with other resins associated with the films and sealants prior to extrusion. Other means of coloring the films and sealants can be implemented without departing from the spirit and scope of the present application.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined only in the claims of the non-provisional application when viewed in their proper perspective based on the prior art.

What is claimed is:

1. A package having opposing first and second sides defining an interior therebetween that is adapted to be accessible when the package is in an open configuration, and inaccessible when the package is in a closed configuration, the package comprising:
    a first film forming the first side and including a light scattering layer; and
    a second film forming the second side and heat sealed, ultrasonic sealed, or impulse sealed to the first film at a sealing portion when the package is in the closed configuration, wherein the second film contains an optical brightener that causes the second film to fluoresce when exposed to ultraviolet light passing through the light scattering layer at the sealing portion.

2. The package of claim 1, wherein the optical brightener is bis-stilbene.

3. The package of claim 1, wherein the light scattering layer further contains a white pigment.

4. The package of claim 3, wherein the white pigment is titanium dioxide.

5. The package of claim 1, wherein the second film is clear.

6. The package of claim 1, wherein the sealing portion is configured as a solid strip.

7. The package of claim 6, wherein the solid strip is along at least a portion of a peripheral edges of the package.

8. The package of claim 7, in which the package is peelable or non-peelable.

9. The package of claim 1, wherein the light scattering layer comprises a non-woven material.

10. The package of claim 1, wherein the second film comprises at least one of polyethylene, polyester, nylon, and/or polypropylene.

11. A method of inspecting a seal of a package having opposing first and second sides defining an interior therebetween that is adapted to be accessible when the package is in an open configuration, and inaccessible when the package is in a closed configuration, the method comprising:
    heat sealing, ultrasonic sealing, or impulse sealing a first portion of a first film having a light scattering layer to a second portion of a second film to create the seal, the first film forming the first side and the second film forming the second side, the second film containing an optical brightener causing the second film to fluoresce when exposed to ultraviolet light passing through the light scattering layer at the seal when the package is in the closed configuration;
    exposing the seal to an ultraviolet (UV) light source; and
    detecting a fluorescence.

12. The method of claim 11, further comprising determining the first film and the second film are in intimate contact at the seal when at least some UV light passes through the light scattering layer and is absorbed by the optical brightener.

13. The method of claim 11, in which the detecting comprises a computerized vision inspection.

14. The method of claim 11, in which the detecting maintains an integrity of the seal.

15. A sealing system comprising:
    a package having opposing first and second sides defining an interior therebetween that is adapted to be accessible when the package is in an open configuration, and inaccessible when the package is in a closed configuration, the package including:
        a first film forming the first side and including a light scattering layer;
        a second film forming the second side and heat sealed, ultrasonic sealed, or impulse sealed to the first film at a sealing portion, the second film contains an optical brightener that causes the second film to fluoresce when exposed to ultraviolet light passing through the light scattering layer at the sealing portion when the package is in the closed configuration; and
    a detector configured to detect a fluorescence.

16. The sealing system of claim 15, wherein the optical brightener is bis-stilbene.

17. The sealing system of claim 15, wherein the light scattering layer further contains a white pigment.

18. The sealing system of claim 15, wherein the detector comprises a computerized vision inspector or a user.

19. A sealing element comprising:
    a light scattering layer containing titanium dioxide; and
    a fluorescing layer coupled to the light scattering layer, wherein the fluorescing layer contains an optical brightener that causes the fluorescing layer to fluoresce when exposed to ultraviolet light passing through the light scattering layer at portions of the sealing element where the light scattering layer and fluorescing layer are in contact.

* * * * *